United States Patent Office 3,649,504
Patented Mar. 14, 1972

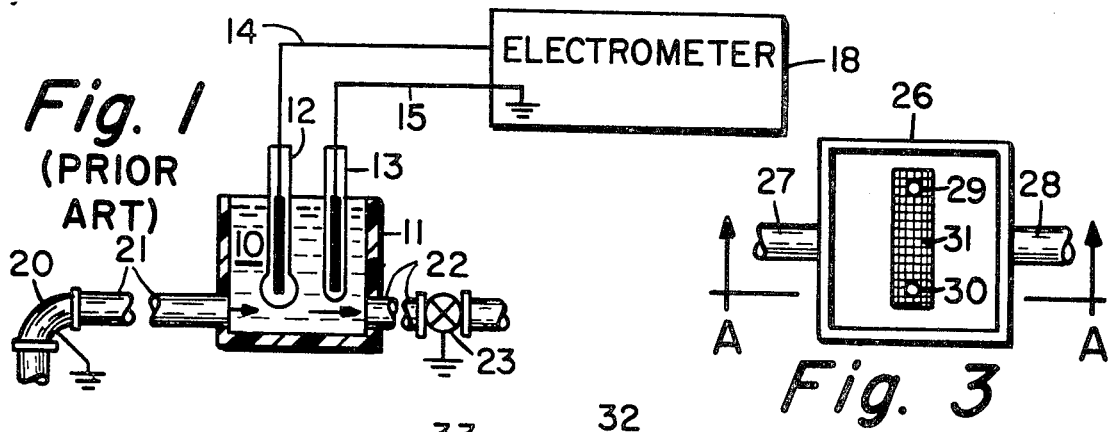
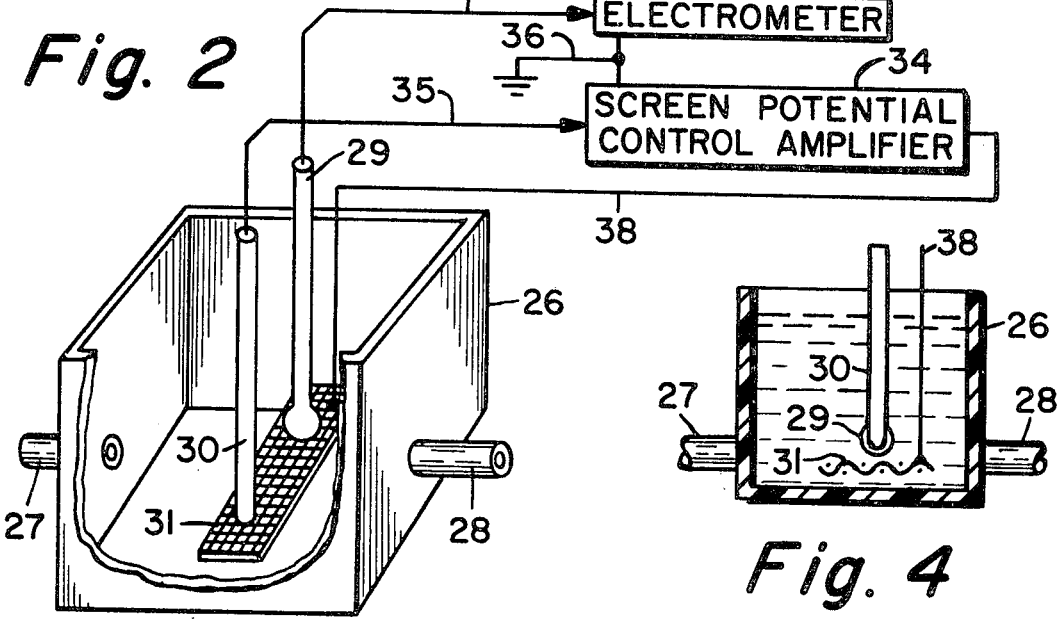
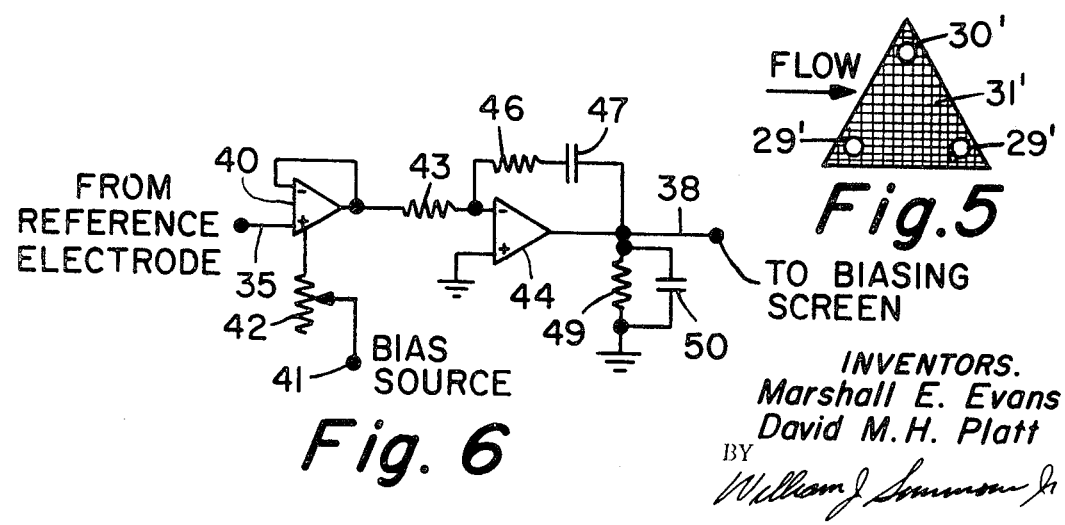

3,649,504
SYSTEM FOR CONTROLLING THE ELECTRICAL FIELD IN A FLUID ANALYZING CHAMBER
Marshall E. Evans, Millerton, Pa., and David M. H. Platt, Hopkinton, Mass., assignors to Corning Glass Works, Corning, N.Y.
Filed Apr. 17, 1970, Ser. No. 29,468
Int. Cl. G01n 27/00
U.S. Cl. 204—195
8 Claims

ABSTRACT OF THE DISCLOSURE

A sample analyzing chamber for flow-through analysis of a sample solution includes an equipotential screen disposed adjacent the tips or active portions of all electrodes in the chamber. The voltage sensed by the reference electrode is amplified and inverted by a control amplifier, the output of which is applied to the screen. Any deviation of the reference electrode potential from the ground potential of the circuitry of the electrometer or other utilization means results in the application of a voltage from the control amplifier to the screen. This voltage is of proper amplitude and polarity to drive the reference electrode and the potential of the solution in the vicinity of the screen back to ground potential. The ion-sensing electrode signal, which is now referenced to ground, is coupled to the electrometer.

BACKGROUND OF THE INVENTION

This invention relates to an improved flow-through sample analyzing system of the type wherein ion sensing and reference electrodes are positioned in a continuously flowing stream of sample containing solution.

Heretofore, a sample of solution to be analyzed has been disposed in an insulated bench top container in which there are immersed one or more ion sensing electrodes and a reference electrode. The magnitude of the potential difference between the conductors extending from an ion sensing electrode and the reference electrode, which is a function of the specific ion concentration of the body of test solution, is applied to a millivolt meter or electrometer which provides a readout in terms of concentration. In such a bench top study wherein the beaker is made of glass or plastic, the test solution is isolated from ground until the reference electrode is inserted therein. The reference electrode is usually grounded to the chassis of the electrometer, and current flows until the test solution in the beaker is also at ground potential. The specific ion electrode contains a standard solution in which is immersed a reference electrode. This electrode follows the potential of the external solution, differing by an amount dependent on the concentrations in the two solutions and the temperature.

If for some reason the test solution were not at the ground potential of the electrometer, the meter reading would indicate an offset from the true output of the specific ion electrode. Such would be the case if the conventional ion sensing and reference electrodes described above were mounted in a flow cell type sample analyzing chamber wherein inlet and outlet pipes connected thereto provided a continuous flow of test solution therethrough. Such an arrangement is shown in U.S. Pat. No. 2,705,220 entitled "Electro-Chemical Apparatus," issued Mar. 29, 1955 to E. P. Arthur. For example, assume that the flow cell is made of non-conductive material, that dissimilar metals are used as pipe connections upstream, and downstream from the flow cell and that these conductive pipe connections are electrically connected to ground. These dissimilar metals form a battery, and there is an electric field established between them. The relative positions of the ion sensing and reference electrodes in the flow cell can cause them to be located at different potentials in this field. Even a true differential electrometer could not provide a reading of the actual ion sensing electrode potential. As the conductivity of the solution or the oxidation state of the metals change, the electrometer readings would also change. Such distortion could occur regardless of where the dissimilar metals are located. For example, one might be located in the drain and the other in the water supply. As long as there is a continuous path of conductive solution from one to the other, a potential gradient exists.

The problem discussed hereinabove has been long recognized and at least one solution has been heretofore proposed. U.S. Pat. No. 2,108,294 entitled "Method and Apparatus for Measuring Ion Concentration," issued Feb. 15, 1938 to E. D. Doyle et al. discloses an apparatus which avoids potential effects unrelated to the ion-concentration of the solution. The electrodes of the ion-concentration cell are isolated from ground, and when the solution flows through a grounded conduit, it is delivered to, and discharged from the ion-concentration cell in streams which are broken up into drops. The apparatus of this patent avoids the detrimental potential effects described above by causing the solution to flow in drops so that there is no continuous electrical connection between metals which could generate an electrical potential. However, the very means whereby this apparatus overcomes undesirable potential effects also introduces a disadvantage which is untenable in many analytical systems, i.e., the flow of test solution through the test cell is so low as to be completely unacceptable.

SUMMARY OF THE INVENTION

Therefore, an object of the present invention is to provide an improved flow-through sample analyzing chamber which overcomes the above-noted disadvantages of the prior art.

A further object of this invention is to provide a flow-through sample analyzing chamber in which a uniform controllable internal electric field is provided in the vicinity of the active portions of the ion sensing and reference electrodes.

Another object of the present invention is to provide electrical circuit means for sensing the potential of the reference electrode in a flow-through sample analyzing chamber and feeding back to conductive means in the chamber a voltage of proper polarity to offset any deviation in reference electrode potential from a given reference potential.

Briefly, the above objects are attained by providing a system for controlling the electrical field in an apparatus for analyzing a sample fluid. This system comprises a sample chamber for containing the sample fluid, in which are disposed a reference electrode and at least one ion sensing electrode, the active portions of which are submerged in the sample fluid. Conductive means are disposed in the chamber in contact with a substantial portion of the fluid in the vicinity of the active portions of the electrodes. Amplifier means responsive to the electrical potential sensed by the reference electrode provides the conductive means with a voltage of such amplitude and polarity that the electrical field in the vicinity of the reference and ion sensing electrodes is driven toward the reference potential of the amplifier means.

BRIEF DESCRIPTION OF THE DRAWINGS

FIG. 1 shows a cross-sectional view of a prior art flow-through sample analyzing chamber.

FIG. 2 is an oblique view of a basic embodiment of a sample analyzing chamber constructed in accordance with the present invention.

FIG. 3 is a plan view of the flow cell of FIG. 2.

FIG. 4 is a cross-sectional view taken along lines A—A of FIG. 3.

FIG. 5 is a top view of another embodiment of this invention in which more than one ion sensing electrode is utilized.

FIG. 6 is a schematic diagram of a screen potential control amplifier suitable for use in conjunction with the present invention.

DETAILED DESCRIPTION

FIG. 1 illustrates an extreme case which may be encountered when a flow-through sample analyzing chamber is connected to a piping system which provides and disposes of a continuously flowing sample solution. Nonconductive container 11 contains a solution in which are disposed a conventional ion sensing electrode 12 and a reference electrode 13. The electrodes 12 and 13 are respectively connected by conductors 14 and 15 to an electrometer 18 or other utilization means such as a process control system, conductor 15 being connected to the electrometer ground terminal. The potential difference appearing between conductors 14 and 15 is a function of the specific ion concentration of the solution 10, this potential difference being used to actuate the electrometer.

To illustrate the disadvantages of the prior art analyzing chamber illustrated in FIG. 1, consider the following specific example. A galvanized iron elbow 20 is located upstream of the container 11 and is connected thereto by a pipe 21, and a brass gate valve 23 is located downstream from the container 11 and is connected thereto by a pipe 22. Pipes 21 and 22 may be either conductive or non-conductive. Both the elbow 20 and the gate valve 23 are electrically connected to ground. The galvanized iron elbow 20 and brass gate valve 23 constitute a battery, and an electric field established between the zinc and brass may vary up to 1.5 volts away from ground. The specific ion and reference electrodes 12 and 13, respectively, are at different potentials in this field due to their relative positions in the container 11. Even a true differential electrometer could not provide a reading of the actual specific ion electrode potential. As the oxidation states of the metals change, the extraneous potentials and therefore the electrometer reading also change. The electrometer reading may also be erroneously changed by a change in the distribution of electrical potential whenever the conductivity of the test solution changes.

In accordance with the present invention the disadvantages of prior art flow cells of the type shown in FIG. 1 are overcome by a voltage feedback circuit used in conjunction with a flow cell such as that shown in FIGS. 2–4. In these figures a sample analyzing chamber 26 is provided with inlet and outlet pipes 27 and 28, respectively, which provides a flow of sample fluid through chamber 26. Disposed within chamber 26 are ion sensing electrode 29 and reference electrode 30, which are preferably symmetrically located with respect to the flow of test solution through the chamber. This relationship is better illustrated in a plan view of the chamber which is shown in FIG. 3. Equally spaced from electrodes 29 and 30 is conductive means such as a screen 31 which may be located beneath the electrodes 29 and 30 as shown in FIG. 2, or which may be located more toward the sides of the electrodes. The primary requisite for screen 31 is that it be located equidistant from the active part of all electrodes and it preferably should encompass more than the active area through or over which test solution flows to reach all of the electrodes. The screen should also be in contact with a substantial portion of the sample fluid in the vicinity of the electrodes. Thus, in the two electrode system shown in FIGS. 2–4, the active area is considered to be that area enclosed by the circumference of screen 31. As shown in FIG. 4, which is a cross-section taken along lines A—A of FIG. 3, screen 31 is disposed substantially equidistant from the two electrodes 29 and 30. FIG. 5 is a plan view of an embodiment having two ion sensing electrodes 29' and a reference eelctrode 30'. In this figure screen 31' includes an active area which lies beneath the tips of all of the electrodes.

In FIG. 2, ion sensing electrode 29 is coupled to an electrometer 32 by a conductor 33 and reference electrode 30 is connected to screen potential control amplifier 34 by a conductor 35. Both the electrometer 32 and amplifier 34 have a common ground connection 36. Amplifier 34 has a high input impedance and performs the following funutions. It senses the deviation of the input voltage between condutor 35 and ground connection 36 and amplifies and inverts this signal. Preferably, the amplifier output signal is integrated so that the output may float with respect to the input voltage level. A parallel R-C filter connected to the output of the amplifier insures that the amplifier output does not respond too rapidly to changes at the input thereof. The overall function of the amplifier is to provide an area adjacent the tips of all electrodes of zero potential relative to the reference potential of the electrometer. The amplifier output is coupled by conductor 38 to screen 31. The amplifier output must provide sufficient current to screen 31 to eliminate the potential deviation between conductors 35 and 36. It has been found that this type of feedback connection between the reference electrode 30 and screen 31 has resulted in the maintenance of the reference potential electrode within 0.3 millivolt from ground so that the voltage supplied by the ion sensing electrode is substantially equal to the logarithm of the ionic activity of the test solution.

FIG. 6 shows a schematic diagram of a circuit which may be used as the amplifier of FIG. 2. A preamplifier 40 comprising a high input impedance field effect transistor is used as a non-inverting voltage follower. A bias source 41 is connected through a variable resistor 42 to amplifier 40 to provide bias control. The output of amplifier 40 is connected by a resistor 43 to the input of an operational amplifier 44 which is a general purpose type amplifier used as an inverting integrator at moderate gain. A feedback circuit comprising series connected resistor 46 and capacitor 47 is connected between the output and input terminals of amplifier 44 and performs the integrating function. A parallel RC network consisting of resistor 49 and capacitor 50, which is connected between the output of amplifier 44 and ground, stabilizes the amplifier output voltage. The output signal from amplifier 44 is connected by way of conductor 38 to the biasing screen.

Prior to the incorporation of an equipotential screen in the flow cell adjacent the electrodes and prior to the use of a screen potential control amplifier to bias the screen, the range of reference electrode potential drift referenced to ground was ±100 mv./week. The range of reference electrode potential drift was reduced to ±0.1 mv./week after the screen and amplifier circuit of this invention was incorporated into the flow cell system. These improved results were obtained by utilizing a flow cell of the type disclosed in U.S. patent application Ser. No. 29,467, entitled "Flow-Through Chamber for Analysis of Continuously Flowing Sample Solution," filed on even date herewith, in conjunction with an amplifier of the type schematically illustrated in FIG. 6 having the following components.

Amplifier 40—Philbrick Nexus Model EP 25 AU
Amplifier 44—Philbrick Nexus EP 85 AU
Resistor 43—200K ohms
Resistor 46—1 M ohms
Resistor 49—1 M ohms
Capacitor 47—0.01 µf.
Capacitor 50—4500 mf.

Although the preferred embodiment of the present invention has been described as including a discrete conductive member such as a screen immersed in the sample fluid adjacent the active portions of the electrodes, such a conductive member could be eliminated if the entire sample analyzing chamber were made of conductive material.

Such a conductive chamber must be insulated by connecting it to non-conductive pipes and disposing it on non-conductive supports. In such a modification, all conductive parts of the chamber should be made of the same metal, and that metal should not be easily corrodible to avoid differential corrosion effects. Since the avoidance of differential corrosion effects is difficult to achieve, this modification is not preferred. The preferred equipotential surface is a screen which corrodes more uniformly than a metal analyzing chamber and which gives a more uniform electrical field within the chamber. A screen is also preferred over a solid metal plate since a screen can provide a greater area of contact with the solution, and sample solution can flow through it. A screen may corrode to the extent that portions thereof separate, but it can easily be replaced.

We claim:
1. A system for controlling the electrical field in an apparatus for analyzing a sample fluid comprising
   a sample chamber for containing said sample fluid,
   a reference electrode so disposed in said chamber that the active portion thereof is adapted to be submerged in said sample fluid,
   at least one ion sensing electrode so disposed in said chamber that the active portion thereof is adapted to be submerged in said sample fluid,
   conductive means disposed in said chamber and adapted to be in contact with a substantial portion of said fluid in the vicinity of said active portions of said electrodes, and
   amplifier means having an input connected to said reference electrode and an output connected to said conductive means, and having a reference potential source against which potentials applied to said input are referenced, said amplifier means being responsive to the electrical potential of said reference electrode and providing said conductive means with a voltage of such amplitude and polarity that the electrical field in the vicinity of said reference and ion sensing electrodes is driven toward the reference potential of said amplifier means.

2. A system in accordance with claim 1 wherein said conductive means is a planar conductive member adapted to be disposed in said fluid, said electrodes being disposed equidistant from said conductive member.

3. A system in accordance with claim 2 wherein said conductive member is a screen.

4. A system in accordance with claim 1 wherein said amplifier means comprises a high impedance preamplifier, an inverting, integrating amplifier connected to the output of said preamplifier, the output thereof being connected to said conductive means.

5. A system in accordance with claim 4 further comprising means connected to the output of said amplifier means for smoothing the voltage variations appearing at the output thereof.

6. A system in accordance with claim 1 further comprising means for providing a continouus flow of sample fluid through said chamber.

7. A system in accordance with claim 1 further comprising utilization means having an input connected to said at least one ion sensing electrode, said utilization means including electronic circuitry having a reference potential source against which the potential of said at least one ion sensing electrode is compared, the reference potential of said utilization means being identical to the reference potential of said amplifier means.

8. A system in accordance with claim 1 wherein said chamber is made of conductive material, said conductive means being that portion of the inside surface of said chamber that is in contact with said fluid.

References Cited
UNITED STATES PATENTS
2,912,367  11/1959  Asendorf et al _____ 204—1 T GERALD L. KAPLAN, Primary Examiner U.S. Cl. X.R.
204—1 T; 324 —29, 30